United States Patent [19]

Yanagisawa

[11] Patent Number: 5,481,936
[45] Date of Patent: Jan. 9, 1996

[54] ROTARY DRIVE POSITIONING SYSTEM FOR AN INDEXING TABLE

[75] Inventor: Ken Yanagisawa, Matsumoto, Japan

[73] Assignee: Yugen Kaisha Sozoan, Nagano, Japan

[21] Appl. No.: 264,933

[22] Filed: Jun. 24, 1994

[30] Foreign Application Priority Data

Jun. 29, 1993 [JP] Japan ............................ 5-158499

[51] Int. Cl.⁶ .......................... A47B 11/00; G05G 11/00
[52] U.S. Cl. ............................ 74/490.08; 74/490.07; 74/490.1; 108/139
[58] Field of Search .................. 74/490.07, 490.08, 74/490.09, 490.1; 108/20, 139

[56] References Cited

U.S. PATENT DOCUMENTS

| | | | |
|---|---|---|---|
| 3,762,275 | 10/1973 | Imamura | 108/139 |
| 5,036,723 | 8/1991 | Matsumoto | 74/490.08 |
| 5,323,712 | 6/1994 | Kikuiri | 74/490.08 |

Primary Examiner—Richard M. Lorence
Assistant Examiner—David Fenstermacher
Attorney, Agent, or Firm—Birch, Stewart, Kolasch & Birch

[57] ABSTRACT

A rotary drive mechanism, which is capable of precisely controlling the rotational angle of an output shaft or a rotor. In the rotary drive system of the present invention, a first moving guide is provided in parallel to first guides, each end section of the first moving guide is movably connected to second guides. A second moving guide is provided in parallel to the second guides, each end section of the second moving guide is movably connected to the first guides. A moving body is capable of moving on the first and the second moving guides. A first motor moves the moving body in the first direction, and a second motor moves the moving body in the second direction. A lever rotates an output shaft when the moving body moves round the output shaft, an outer end section of the lever is rotatably connected to the moving body and capable of moving in the longitudinal direction with respect thereto, an inner end section of the lever is fixed to one end of the lever.

10 Claims, 5 Drawing Sheets

ROTARY DRIVE POSITIONING SYSTEM FOR AN INDEXING TABLE

BACKGROUND OF THE INVENTION

The present invention relates to a rotary drive system, more precisely it relates to a rotary drive system, which is capable of rotating an output shaft or a rotor on its axis.

An index table for machining works is known as an example of the rotary drive system. In the conventional index table, an output shaft is rotated on its axis by a motor and reduction gears, so that a rotary table, which is fixed to the output shaft, is rotated.

The rotary table is rotated through a prescribed angle for each machining step. To rotate the rotary table for precise positioning of the works, the rotational angle of the rotary table must be precisely controlled. The precise control of the rotary table is executed by controlling the rotation of the output shaft or the driving of the motor.

However, the above described conventional index table, for example, has a disadvantage. As described, the positioning of the works is executed by controlling the rotational angle of the rotary table or the output shaft. Even if the output shaft is rotated by a precise mechanism, it is unavoidable to make errors of rotational angle of the output shaft and the rotary table due to, e.g., backlash of the reduction gears. To make wide machining spaces, the works are located in the vicinity of an outer edge of the rotary table. Namely, the works are located separate away from the axis of the rotary table. Thus, said errors are enlarged at the positions of the works even if said errors are small for the output shaft, so that it is very difficult to raise the positioning accuracy of the works.

SUMMARY OF THE INVENTION

An object of the present invention is to provide a rotary drive system, which is capable of precisely controlling the rotational angle of an output shaft or a rotor.

To achieve the object, one basic structure of the rotary drive system of the present invention comprises:
- a pair of first guides being provided in a first direction;
- a pair of second guides being provided in a second direction perpendicular to the first direction;
- a first moving guide being provided in parallel to the first guides, each end section of the first moving guide being movably connected to each of the second guides whereby the first moving guide is capable of moving in the second direction along the second guides;
- a second moving guide being provided in parallel to the second guides, each end section of the second moving guide being movably connected to each of the first guides whereby the second moving guide is capable of moving in the first direction along the first guides;
- a moving body being capable of moving on the first moving guide and the second moving guide;
- a first driving means for moving the moving body in the first direction;
- a second driving means for moving the moving body in the second direction;
- an output shaft being capable of rotating on its axis; and
- a lever for rotating the output shaft when the moving body moves round the output shaft, an outer end section of the lever being rotatably connected to the moving body and capable of moving in the longitudinal direction with respect thereto, an inner end section of the lever being fixed to one end of the lever.

Another basic structure of the present invention comprises:
- a pair of first guides being provided in a first direction;
- a pair of second guides being provided in a second direction perpendicular to the first direction;
- a first moving guide being provided in parallel to the first guides, each end section of the first moving guide being movably connected to each of the second guides whereby the first moving guide is capable of moving in the second direction along the second guides;
- a second moving guide being provided in parallel to the second guides, each end section of the second moving guide being movably connected to each of the first guides whereby the second moving guide is capable of moving in the first direction along the first guides;
- a moving body being capable of moving on the first moving guide and the second moving guide;
- a first driving means for moving the moving body in the first direction;
- a second driving means for moving the moving body in the second direction;
- a rotor being capable of rotating on its axis; and
- a lever for rotating the rotor when the moving body moves round the axis of the rotor, the lever being fixed to the rotor, an outer end section of the lever being rotatably connected to the moving body and capable of moving in the longitudinal direction with respect thereto.

Furthermore, the rotary drive systems may have a first parallel mechanism for maintaining the first moving guide parallel with respect to the first guides, and a second parallel mechanism for maintaining the second moving guide parallel with respect to the second guides.

In the present invention, since the outer end section of the lever is rotatably connected to the moving body and capable of moving in its longitudinal direction with respect thereto, the output shaft or the rotor is rotated on its axis when the moving body moves round the axis of the output shaft or the rotor. The accuracy of the rotational angle depends on the positioning accuracy of the moving body. As described above, the moving body is rotatably connected to the outer end section of the lever, so the moving track of the moving body can be long. By the long moving track, many positioning points of the moving body can be set in the track, so that the resolution of the rotational angle of the output shaft and the rotor can be raised.

Especially, by using the first and the second parallel mechanisms, inclination of the first and the second moving guides can be prevented even if the moving body moves on the first and the second moving guides. Thus, the accuracy of the rotary drive system can be further raised, and noise and vibration during operation can be prevented.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Figure 1:
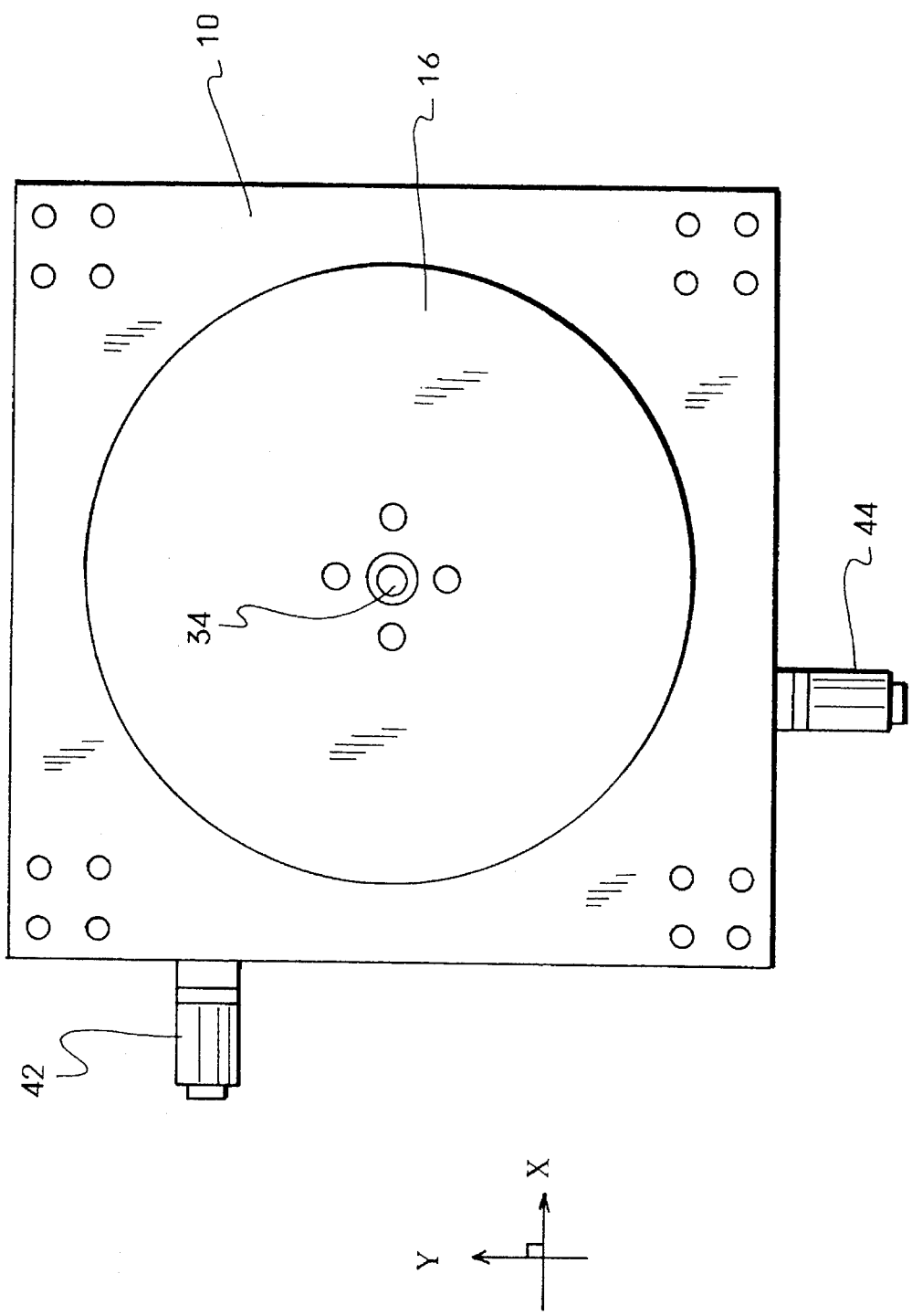
FIG. 1 is a plan view of an index table of a first embodiment of the present invention.

Preferred embodiments of the present invention will now be described in detail with reference to the accompanying drawings.

First Embodiment will be explained with reference to FIGS. 1–4. In this embodiment, an index table will be explained as an example of the rotary drive system.

A system proper includes an upper cover 10 and a lower cover 12. The upper cover 10 and the lower cover 12 are connected by connecting blocks 14, which are provided four corners of the system proper.

A rotary table 16 is rotatably provided above the upper cover 10. For example, works to be machined (not shown) will be mounted on an upper face of the rotary table 16. The rotary table 16 is turned with progress of the machining so as to place the works at the prescribed positions.

A pair of X-guides (first guides) 18a and 18b are provided mutually parallel in an X-direction (first direction). The X-guides 18a and 18b are linear guides, which are fixed on an upper face of the lower cover 12.

A pair of Y-guides (second guides) 20a and 20b are provided mutually parallel in a Y-direction (second direction) perpendicular to the X-direction. The Y-guides 20a and 20b are also linear guides, which are fixed on the upper face of the lower cover 12.

An X-rod (first moving guide) 22 is provided in parallel to the X-guides 18a and 18b. The X-rod 22 is rotatably pierced through sliders 24c and 24d, which are capable of sliding on the Y-guides 20a and 20b in the Y-direction. With this structure, the X-rod 22 is capable of moving in the Y-direction together with the sliders 24c and 24d in the state of being parallel to the X-guides 18a and 18b. Note that, the axial movement of the X-rod 22 is limited by snap rings, which are attached on the X-rod 22.

A Y-rod (second moving guide) 26 is provided in parallel to the Y-guides 20a and 20b. The Y-rod 26 is rotatably pierced through sliders 24a and 24b, which are capable of sliding on the X-guides 18a and 18b in the X-direction. With this structure, the Y-rod 26 is capable of moving in the X-direction together with the sliders 24a and 24b in the state of being parallel to the Y-guides 20a and 20b. Note that, the axial movement of the Y-rod 26 is limited by snap rings, which are attached on the Y-rod 26.

A moving body 28 has a lower part and an upper part. The X-rod 22 is rotatably pierced through the lower part; the Y-rod 26 is rotatably pierced through the upper part. The moving body 26 is capable of moving on the X-rod 22 in the X-direction and on the Y-rod 26 in the Y-direction with slide bearings. Thus, the moving body 28 is capable of doing X-Y movement in a rectangular plane 29, which is rounded by the X-guides 18a and 18b and the Y-guides 20a and 20b.

An X-ball screw (first ball screw) 30, which has high accuracy, is arranged in the X-direction. The X-ball screw 30 is rotatably spanned between the sliders 24c and 24d. The X-ball screw 30 is screwed with a ball nut (not shown), which is fixed in the lower part of the moving body 28. Thus, the moving body 28 is moved in the X-direction together with the Y-rod 26 and the sliders 24a and 24b when the X-ball screw 30 rotates on its axis.

A Y-ball screw (second ball screw) 32, which has high accuracy, is arranged in the Y-direction. The Y-ball screw 32 is rotatably spanned between the sliders 24a and 24b. The Y-ball screw 32 is screwed with a ball nut 54, which is fixed in the upper part of the moving body 28. Thus, the moving body 28 is moved in the Y-direction together with the X-rod 22 and the sliders 24c and 24d when the Y-ball screw 32 rotates on its axis.

An output shaft 34 is provided in the upper cover 10 with ball bearings. The output shaft 34 is capable of rotating on its axis in the ball bearings. An upper end section of the output shaft 34 is projected from an upper face of the upper cover 10 and fixed to a center of the rotary table 16. Thus, the rotary table 16 is rotated on its axis when the output shaft 34 is rotated.

A lever 36 makes the output shaft 34 rotate when the moving body 28 moves round the output shaft 34. An outer end section of the lever 36 is slidably fitted in a groove 40 of a connecting member 38, which is rotatably attached to the moving body 28 with a bearing. Thus, the outer end section of the lever 36 is rotatably connected to the moving body 28 and capable of moving in the longitudinal direction with respect to the moving body 28. On the other hand, an inner end of the lever 36 is fixed to a lower end of the output shaft 34.

An X-motor (first motor) 42 makes the X-ball screw 30 rotate. The X-motor 42 is a servo motor having a locking mechanism and being mounted on the slider 24d. The moving direction of the moving body 28, etc. in the X-axis is defined by selecting the rotational direction of the X-motor 42.

A Y-motor (second motor) 44 makes the Y-ball screw 32 rotate. The Y-motor 44 is also a servo motor having a locking mechanism and being mounted on the slider 24b. The moving direction of the moving body 28, etc. in the Y-axis is defined by selecting the rotational direction of the Y-motor 42.

X-racks 46a and 46b are fixed on the upper face of the lower cover 12, and provided in the X-direction mutually parallel.

Y-racks 48a and 48b are fixed on the upper face of the lower cover 12, and provided in the Y-direction mutually parallel.

Y-pinions 50a and 50b are respectively fixed at each end of the X-rod 22, whose both end sections are projected outward from the sliders 24c and 24d. The Y-pinions 50a and 50b are respectively engaged with the Y-racks 48a and 48b. When the X-rod 22 is moved in the Y-direction together with the moving body 28, the Y-pinions 50a and 50b rotate on the Y-racks 48a and 48b. At that time, the X-rod 22 rotates on its axis together with the Y-pinions 50a and 50b. Even if external force, which attempts to incline the X-rod 22 with respect to the X-axis, works to the X-rod 22 during the X-rod 22 is rotated and moved, the Y-pinions 50a and 50b and the Y-racks 48a and 48b, which are mutually engaged, prevents the inclination of the X-rod 22. Namely, a first parallel mechanism for maintaining the X-rod 22 parallel with respect to the X-guide 18a and 18b, etc. is constituted by the Y-pinions 50a and 50b and the Y-racks 48a and 48b.

X-pinions 52a and 52b are respectively fixed at each end of the Y-rod 26, whose both end sections are projected outward from the sliders 24a and 24b. The X-pinions 52a and 52b are respectively engaged with the X-racks 46a and 46b. When the Y-rod 26 is moved in the X-direction together with the moving body 28, the X-pinions 52a and 52b rotate on the X-racks 46*a* and 46*b*. At that time, the Y-rod 26 rotates on its axis together with the X-pinions 52*a* and 52*b*. Even if external force, which attempts to incline the Y-rod 26 with respect to the Y-axis, works to the Y-rod 26 during the Y-rod 26 is rotated and moved, the X-pinions 52*a* and 52*b* and the X-racks 46*a* and 46*b*, which are mutually engaged, prevents the inclination of the Y-rod 26. Namely, a second parallel mechanism for maintaining the Y-rod 26 parallel with respect to the Y-guide 20*a* and 20*b*, etc. is constituted by the X-pinions 52*a* and 52*b* and the X-racks 46*a* and 46*b*.

By employing the high accuracy ball screws 30 and 32 and the first and the second parallel mechanisms, the positioning accuracy of the moving body 28, etc. is raised. Since the inclination of the X-rod 22 and the Y-rod 26 can be prevented by the first and the second parallel mechanisms even if the moving body 28 moves, the output shaft 34 and the rotary table can be stably rotated, and vibration and noise of the system also can be prevented.

Successively, the action of the index table will be explained.

In the First Embodiment, the rotation of the X-ball screw 30 and the Y-ball screw 32 is controlled by a control unit (not shown), which includes a microprocessor, and which controls the X-motor 42 and the Y-motor 44.

Figure 2:
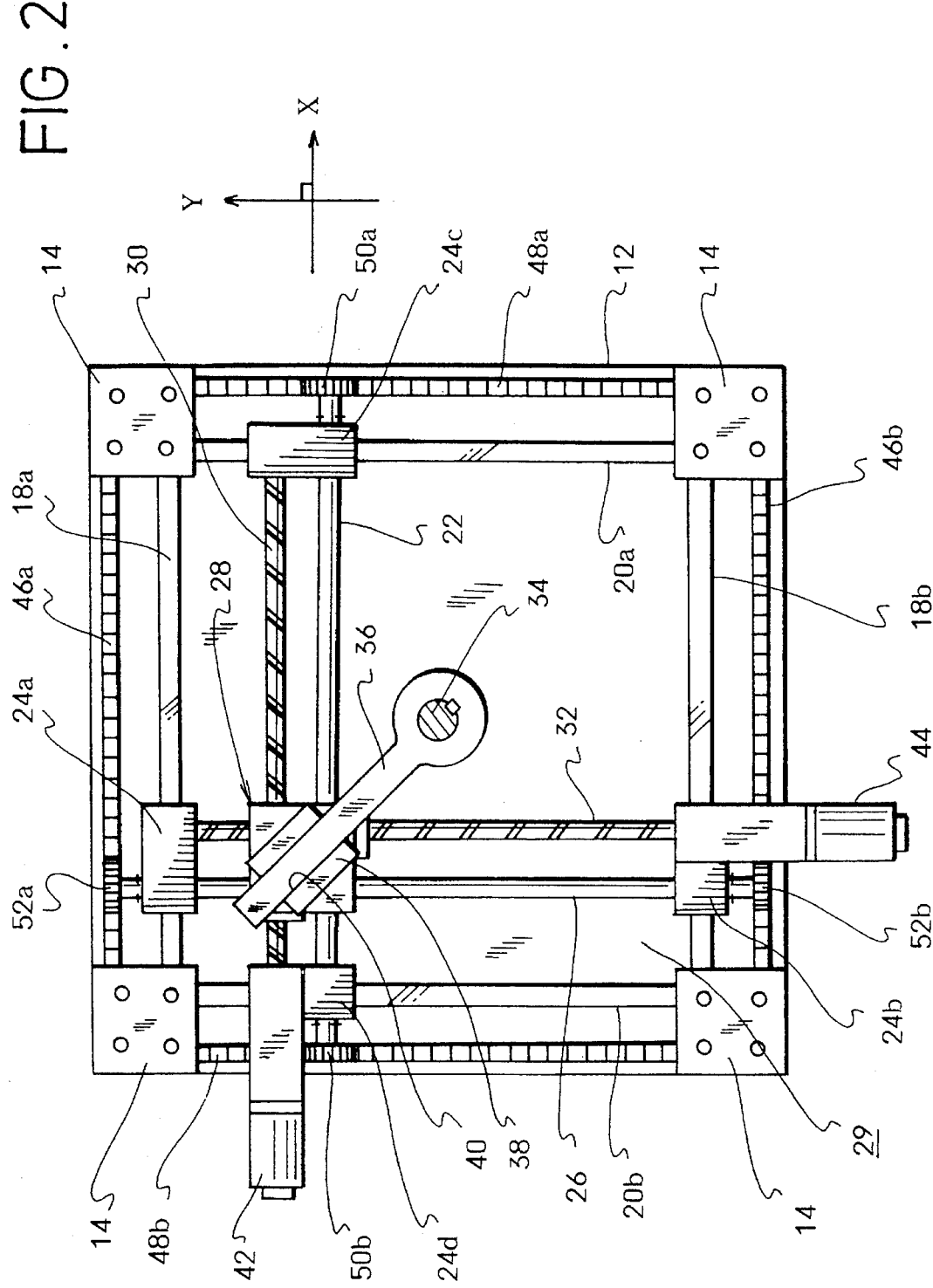
FIG. 2 is a plan view showing an inner structure of the first embodiment.
Figure 3:
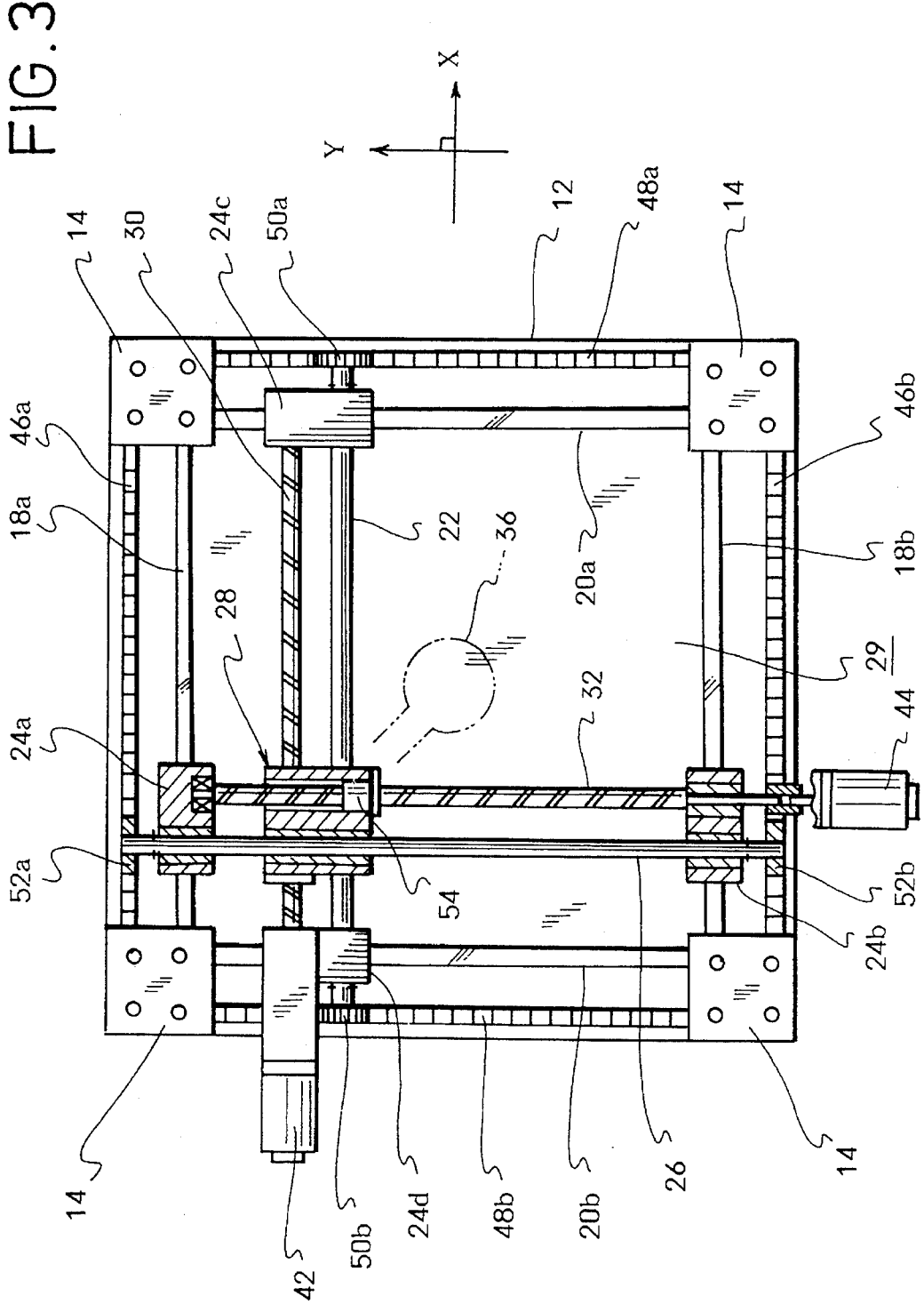
FIG. 3 is a partially sectional plan view of a moving body of the first embodiment.
Figure 4:
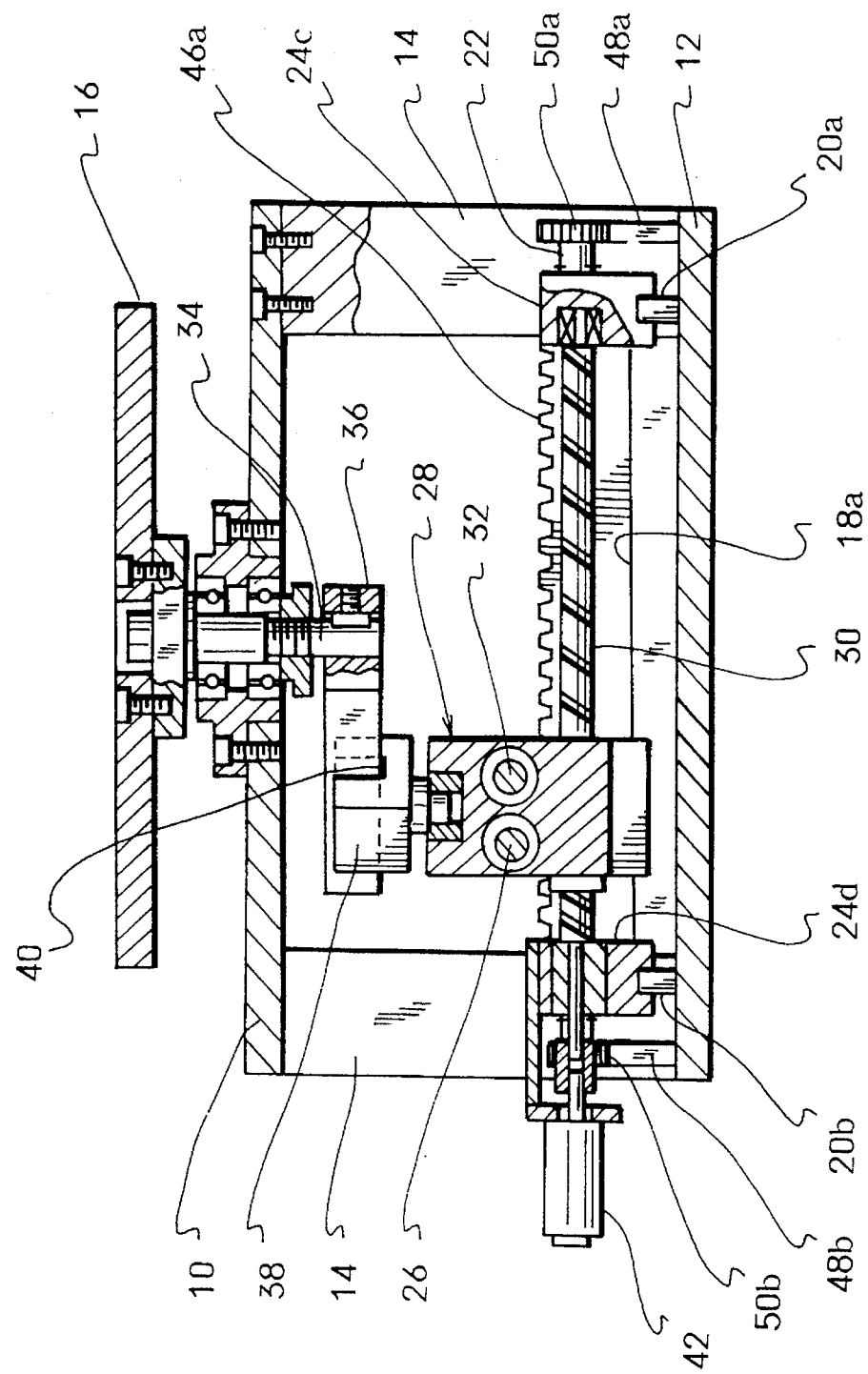
FIG. 4 is a front sectional view of the first embodiment.

In the state shown in FIG. 2, for example, the X-motor 42 is driven to rotate the X-ball screw 30 so as to move the moving body 28 rightward in the X-direction.

When the moving body 28 reaches the prescribed position of the right side, the X-motor 42 is stopped and the Y-motor 44 is driven to rotate the Y-ball screw 32 so as to move the moving body 28 downward in the Y-direction.

When the moving body 28 reaches the prescribed position of the lower side, the Y-motor 44 is stopped and the X-motor 42 is driven to rotate the X-ball screw 30 so as to move the moving body 28 leftward in the X-direction.

When the moving body 28 reaches the prescribed position of the left side, the X-motor 42 is stopped and the Y-motor 44 is driven to rotate the Y-ball screw 32 so as to move the moving body 28 upward in the Y-direction.

With above described actions, the moving body 28 can be moved round the output shaft 34 in the clockwise direction with a rectangular track. While the moving body is moved with the rectangular track, the outer end section of the lever 36 is able to rotate and move in the longitudinal direction thereof because the outer end section thereof is fitted with the connecting member 38 of the moving body 28. Namely, the lever 36 works as a crank, so that the output shaft 34 and the rotary table 16 are rotated in the clockwise direction. Note that, to rotate the output shaft 34 and the rotary table 16 in the counterclockwise direction, the motors 42 and 44 should be driven in the reverse directions to move the moving body 28 in the counterclockwise direction with the rectangular track.

The rotational angle of the rotary table 16 can be controlled by the X-Y positions of the moving body 28. In the present embodiment, the positioning accuracy of the moving body 26 can be quite high because the ball screws 30 and 32 are driven by the servo motors 42 and 44. Additionally, the moving body 28 always corresponds to the outer end section of the lever 36, which is a part of the lever 36 having the longest rotational track. Thus, many positioning points, which can be defined by the positioning of the moving body 28, can be set in the long rotational track. Namely, the control resolution of the X-Y positions of the moving body 28 can be raised, so that that of the rotational angle of the output shaft 34 and the rotary table 16 can be raised. If the moving body 28 is rotatably connected to the inner end section of the lever 36, the rotational track of the section is so short, so that the resolution of the rotational angle of the output shaft 34, etc. cannot be raised.

Additionally, since the the moving body 28 drives the outer end section of the lever 36, the rotational torque of the output shaft 34 can be greater, so that the rotary table 16 can be easily rotated even if it is heavy.

Furthermore, since the ball screws 30 and 32 have locking function and the pinions 50*a*, 50*b*, 52*a* and 52*b* are engaged with the racks 46*a*, 46*b*, 48*a* and 48*b*, the holding torque for holding the rotary table 16 can be greater while the motors 42 and 44 are stopped.

Figure 5:
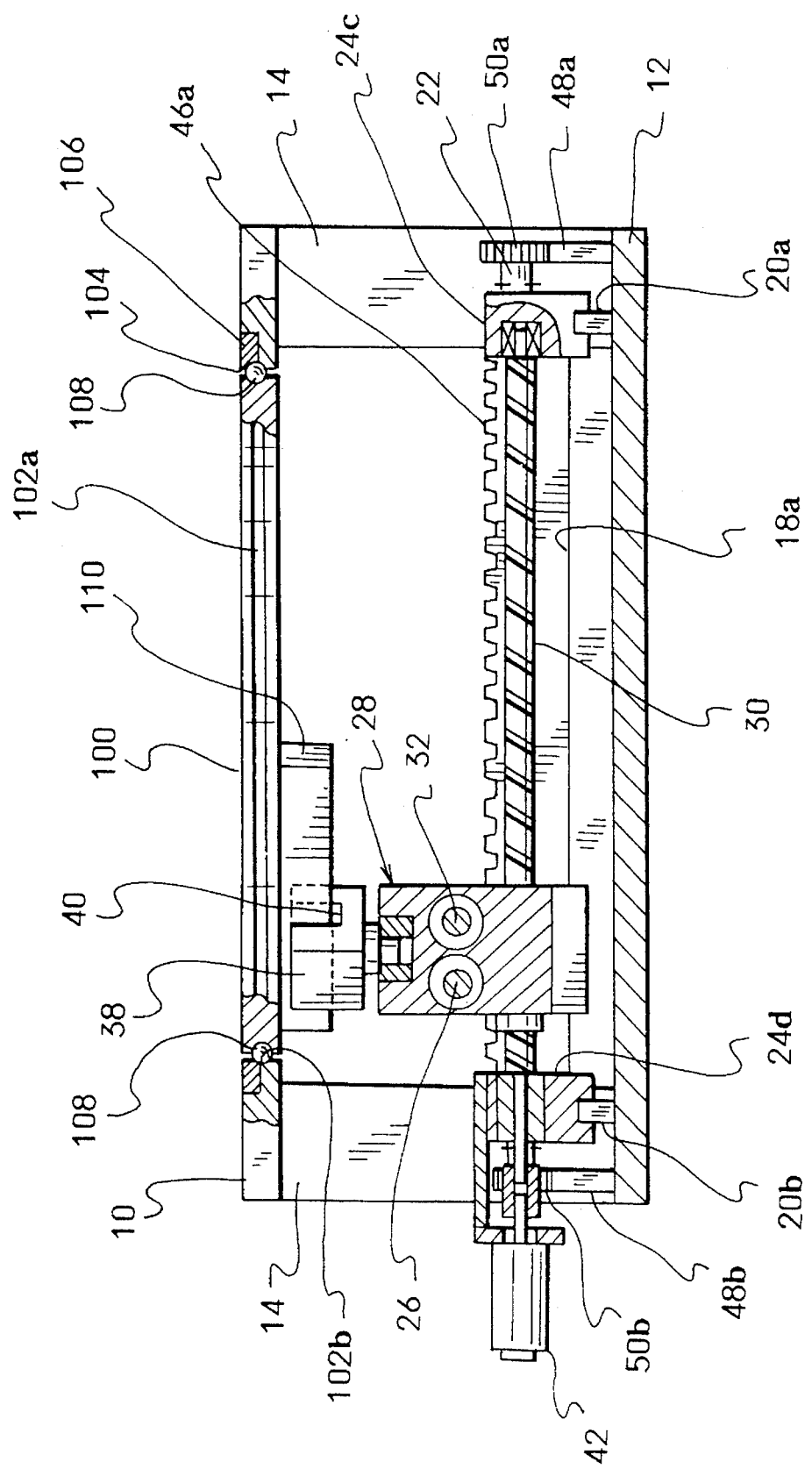
FIG. 5 is a front sectional view of a second embodiment.

The Second Embodiment will be explained with reference to FIG. 5. In this embodiment, too, an index table will be explained as an example of the rotary drive system. Note that, members, which have been shown and explained in the First Embodiment, are assigned the same symbols, and explanation will be omitted.

In the First Embodiment, the rectangular movement of the moving body 28 is converted into the rotation of the rotary table 16 by the lever 36 and the output shaft 34. While in the Second Embodiment, the rectangular movement of the moving body 28 is converted into the rotation of a rotary table (rotor) 100 without using the output shaft 34.

There is formed a circular groove 102*a* on an outer circumferential face of the rotary table 100. There is formed a center hole 104 in a center part of the upper cover 10. A ring retainer 106 is fixed on an inner edge of the center hole 104. By fixing the retainer 106, there is formed a circular groove 102*b* on an inner circumferential face of the center hole 104. The grooves 102*a* and 102*b* are mutually faced, and there are rotatably held metal balls therebetween, so that the rotary table 100 is capable of rotating in the center hole 104 with a ball bearing mechanism.

A lever 110 is fixed on a bottom face of the rotary table 100, and provided in the radial direction with respect to the center of the rotary table 100. An outer end section of the lever 110 is slidably fitted in the groove 40 of the connecting member 38, which is rotatably attached to the moving body 28 with a bearing, as in the First Embodiment. Note that, the lever 110 must be provided in the radial direction with respect to the center of the rotary table 100 but the length of the lever 110 is not limited. The lever 110, for example, may have the length equal to the diameter of the rotary table 100.

In the Second Embodiment too, the moving body 28 is moved with the rectangular track by controlling the motors 42 and 44. Since the outer end section of the lever 110 is slidably fitted in the connecting member 38, the lever 110 is capable of rotating and moving its longitudinal direction with respect to the moving body 28. Thus, the lever 110 is capable of rotating the rotary table 100 as a crank.

In the Second Embodiment, the rotary table 16 is provided in the center hole 104 of the upper cover 10 and the output shaft 34 (see FIG. 4) is omitted, so that the vertical thickness of the rotary drive system can be thinner. And the lever 110 is fixed on the bottom face of the rotary table 110, so that a deformation of the lever 110 caused by bending moment can be prevented in comparison with First Embodiment. By preventing the deformation, the positioning accuracy can be further raised and stable operation can be guaranteed.

In the First Embodiment and Second Embodiment, means for detecting the rotational angle of the rotary tables 16 and 100, e.g., a rotary encoder, may be provided to the system proper or the output shaft 34.

By driving the outer end sections of the levers 36 and 100 with the moving body 28, control resolution of the rotation of the output shaft 34 and the rotary tables 16 and 100 is achieved. Therefore, any driving means whose accuracy is lower than that of the ball screws 30 and 32, e.g., timing belts (see FIG. 14 in U.S. Pat. No. 4,995,277), can be employed with the longer levers 36 and 100. Namely, the rotary drive system of the present invention has possibilities of future development.

Furthermore, linear guides, which are fixed on plates, and which are slidably fitted to the moving body 28, may be used as the first and the second moving guides instead of the rods 22 and 26.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A rotary drive system, comprising:

a pair of first guides being provided in a first direction;

a pair of second guides being provided in a second direction perpendicular to the first direction;

a first moving guide being provided in parallel to said first guides, each end section of said first moving guide being movably connected to each of said second guides whereby said first moving guide is capable of moving in the second direction along said second guides;

a second moving guide being provided in parallel to said second guides, each end section of said second moving guide being movably connected to each of said first guides whereby said second moving guide is capable of moving in the first direction along said first guides;

a moving body being capable of moving on said first moving guide and said second moving guide;

a first driving means for moving said moving body in the first direction;

a second driving means for moving said moving body in the second direction;

an output shaft being capable of rotating on its axis; and a lever for rotating said output shaft when said moving body moves round said output shaft, an outer end section of said lever being rotatably connected to said moving body and capable of moving in the longitudinal direction with respect thereto, an inner end section of said lever being fixed to said output shaft.

2. The rotary drive system according to claim 1, further comprising:

a first parallel mechanism for maintaining said first moving guide parallel with respect to said first guides; and a second parallel mechanism for maintaining said second moving guide parallel with respect to said second guides.

3. The rotary drive system according to claim 2, wherein said first parallel mechanism and said second parallel mechanism are rack-and-pinion mechanisms.

4. The rotary drive system according to claim 1, wherein said first driving means includes a first ball screw for moving said moving body in the first direction and a first motor for driving said first ball screw, and wherein said second driving means includes a second ball screw for moving said moving body in the second direction and a second motor for driving said second ball screw.

5. The rotary drive system according to claim 1, wherein a rotary table is fixed to said output shaft.

6. A rotary drive system, comprising:

a pair of first guides being provided in a first direction;

a pair of second guides being provided in a second direction perpendicular to the first direction;

a first moving guide being provided in parallel to said first guides, each end section of said first moving guide being movably connected to each of said second guides whereby said first moving guide is capable of moving in the second direction along said second guides;

a second moving guide being provided in parallel to said second guides, each end section of said second moving guide being movably connected to each of said first guides whereby said second moving guide is capable of moving in the first direction along said first guides;

a moving body being capable of moving on said first moving guide and said second moving guide;

a first driving means for moving said moving body in the first direction;

a second driving means for moving said moving body in the second direction;

a rotor being capable of rotating on its axis; and a lever for rotating said rotor when said moving body moves round the axis of said rotor, said lever being fixed to said rotor, an outer end section of said lever being rotatably connected to said moving body and capable of moving in the longitudinal direction with respect thereto.

7. The rotary drive system according to claim 6, further comprising:

a first parallel mechanism for maintaining said first moving guide parallel with respect to said first guides; and a second parallel mechanism for maintaining said second moving guide parallel with respect to said second guides.

8. The rotary drive system according to claim 7, wherein said first parallel mechanism and said second parallel mechanism are rack-and-pinion mechanisms.

9. The rotary drive system according to claim 6, wherein said first driving means includes a first ball screw for moving said moving body in the first direction and a first motor for driving said first ball screw, and wherein said second driving means includes a second ball screw for moving said moving body in the second direction and a second motor for driving said second ball screw.

10. The rotary drive system according to claim 6, wherein said rotor is a rotary table.

* * * * *

UNITED STATES PATENT AND TRADEMARK OFFICE
CERTIFICATE OF CORRECTION

PATENT NO. : 5,481,936
DATED : January 9, 1996
INVENTOR(S) : Ken Yanagisawa

It is certified that error appears in the above-indentified patent and that said Letters Patent is hereby corrected as shown below:

```
Title page, Item [54], change "INDEXING TABLE" to
-- OUTPUT SHAFT --

Col. 1, line 2, change "INDEXING TABLE" to --OUTPUT SHAFT--
```

Signed and Sealed this

Sixteenth Day of April, 1996

*Attest:*

BRUCE LEHMAN

*Attesting Officer*  *Commissioner of Patents and Trademarks*